(12) United States Patent
Upreti

(10) Patent No.: US 11,043,671 B2
(45) Date of Patent: *Jun. 22, 2021

(54) BIO-MINERALIZED CATHODE AND ANODE MATERIALS FOR ELECTROCHEMICAL CELL

(71) Applicant: Shailesh Upreti, Ithaca, NY (US)

(72) Inventor: Shailesh Upreti, Ithaca, NY (US)

(73) Assignee: C4V LLC, Vestal, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 16/362,264

(22) Filed: Mar. 22, 2019

(65) Prior Publication Data

US 2019/0296354 A1 Sep. 26, 2019

Related U.S. Application Data

(63) Continuation of application No. 15/699,815, filed on Sep. 8, 2017, now Pat. No. 10,243,213, which is a continuation of application No. 14/300,209, filed on Jun. 9, 2014, now Pat. No. 9,799,883.

(60) Provisional application No. 61/833,099, filed on Jun. 10, 2013.

(51) Int. Cl.
| | |
|---|---|
| *H01M 4/58* | (2010.01) |
| *H01G 11/38* | (2013.01) |
| *H01M 4/62* | (2006.01) |
| *H01G 11/50* | (2013.01) |
| *H01M 4/36* | (2006.01) |

(52) U.S. Cl.
CPC .......... *H01M 4/5825* (2013.01); *H01G 11/38* (2013.01); *H01G 11/50* (2013.01); *H01M 4/364* (2013.01); *H01M 4/366* (2013.01); *H01M 4/624* (2013.01); *Y02E 60/13* (2013.01); *Y10T 428/24802* (2015.01); *Y10T 428/2982* (2015.01)

(58) Field of Classification Search
CPC .... H01M 4/5825; H01M 4/364; H01M 4/624; H01M 4/366; H01G 11/38; H01G 11/50; Y02E 60/13; Y10T 428/2982; Y10T 428/24802
See application file for complete search history.

(56) References Cited

U.S. PATENT DOCUMENTS

| | | | | |
|---|---|---|---|---|
| 2009/0142668 | A1* | 6/2009 | Ishii | ........................ G11B 5/596 |
| | | | | 429/231.8 |
| 2012/0040269 | A1* | 2/2012 | Yates | ....................... C30B 29/14 |
| | | | | 429/482 |

* cited by examiner

*Primary Examiner* — Andrew J. Oyer
(74) *Attorney, Agent, or Firm* — Haukaas Fortius PLLC; Michael H. Haukaas

(57) ABSTRACT

A bio-mineralized composition for use in an electrochemical cell is described. The bio-mineralized composition may comprise a material represented by general formula $y[Li_{1\pm x}M_aO_c] \cdot (1-y)[M_b(PO_4)_{3\pm d}(Ap)_{1\pm e}] \cdot C_z$ or $y[M_a] \cdot (1-y)[M_b(PO_4)_{3\pm d}(Ap)_{1\pm e}] \cdot C_z$ or $y[Li_{1\pm x}M_aO_c] \cdot w[Li_{2\pm x}M_aO_c] \cdot (1-y-w)[M_b(PO_4)_{3\pm d}(Ap)_{1\pm e}] \cdot C_z$ or $y[M_aO_v] \cdot (1-y)[M_b(PO_4)_{3\pm d}(Ap)_{1\pm e}] \cdot C_z$ where M represents at least one element; Ap represents group of mixtures; C represents Carbon or its allotropes; P represents element phosphorous; Si represents silicon; Li represents lithium; B represents boron; O represents oxygen and x, y, z, w, a, b, c, d and e represent a number.

19 Claims, 6 Drawing Sheets

Ball stick view of a bio-mineralized composite structure with spinel material

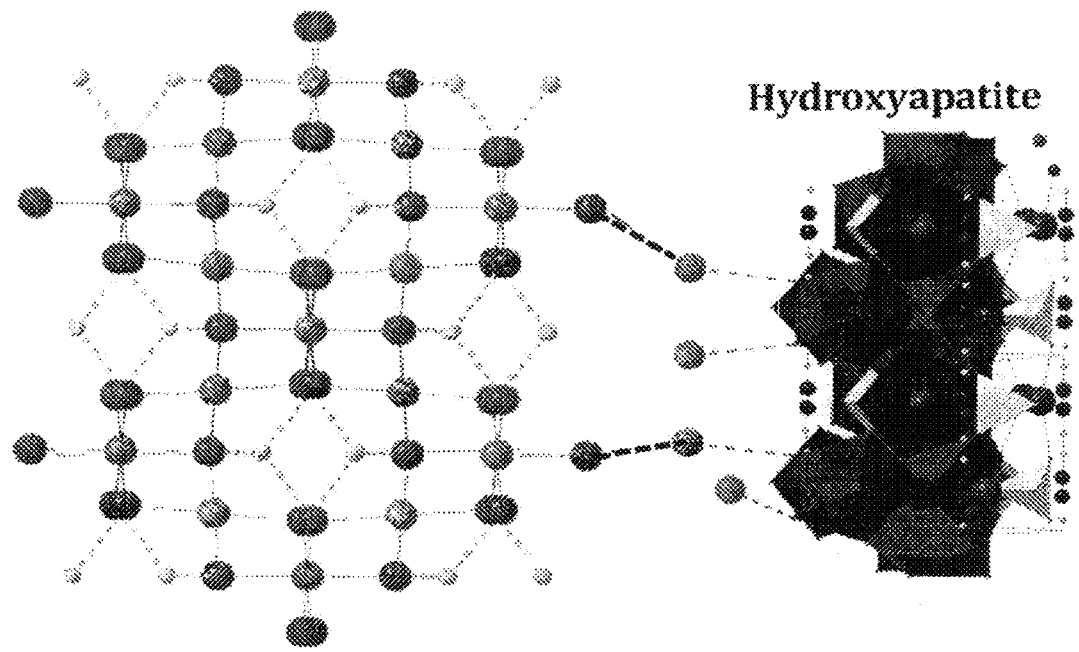
Figure 1: Ball stick view of a bio-mineralized composite structure with spinel material
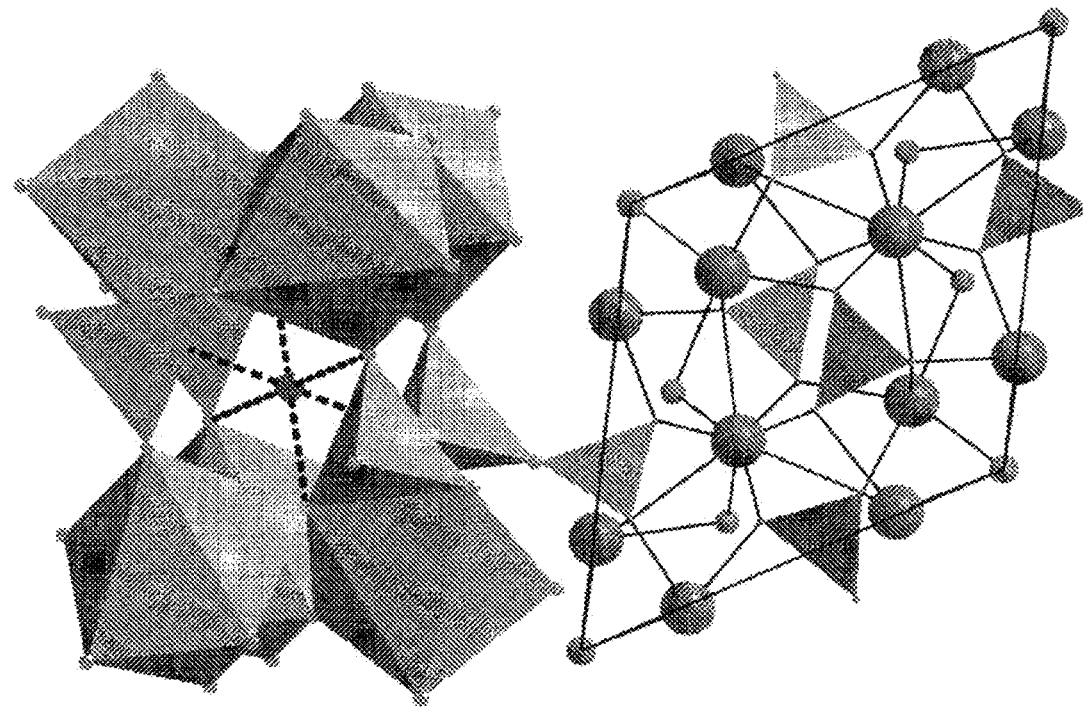
Figure 2: Ball stick view of a bio-mineralized composite structure with Olivine type material

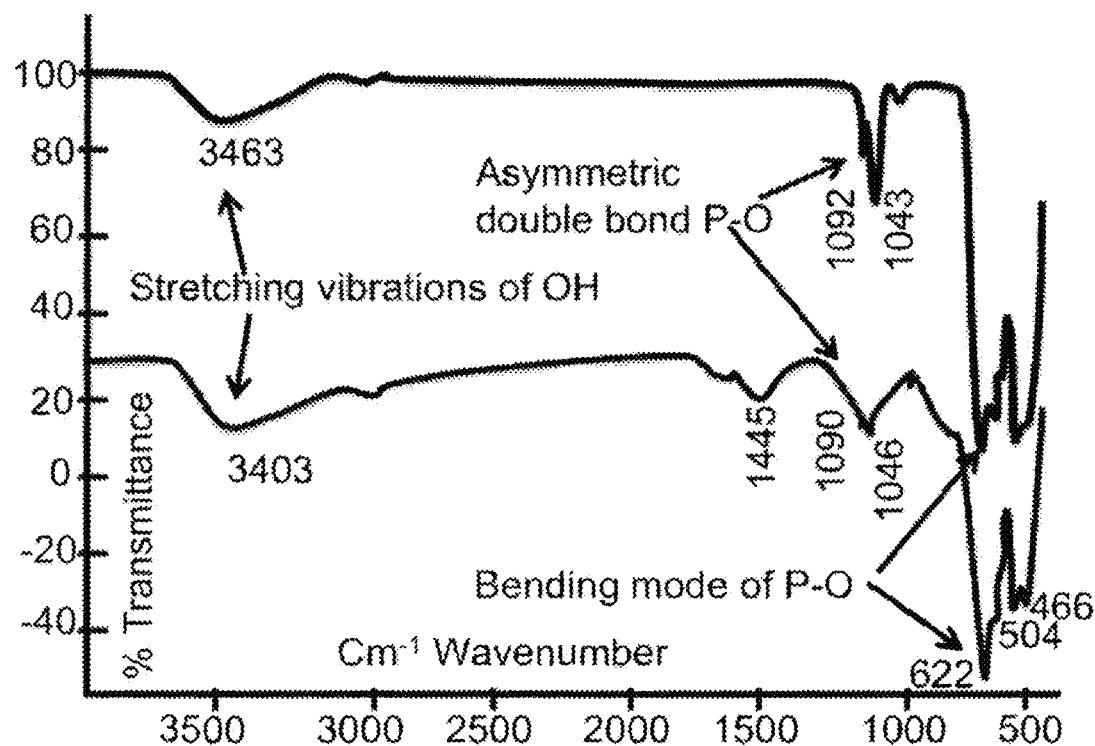
Figure 3: FTIR (Fourier Transformed Infrared) of a bio-mineralized composite material
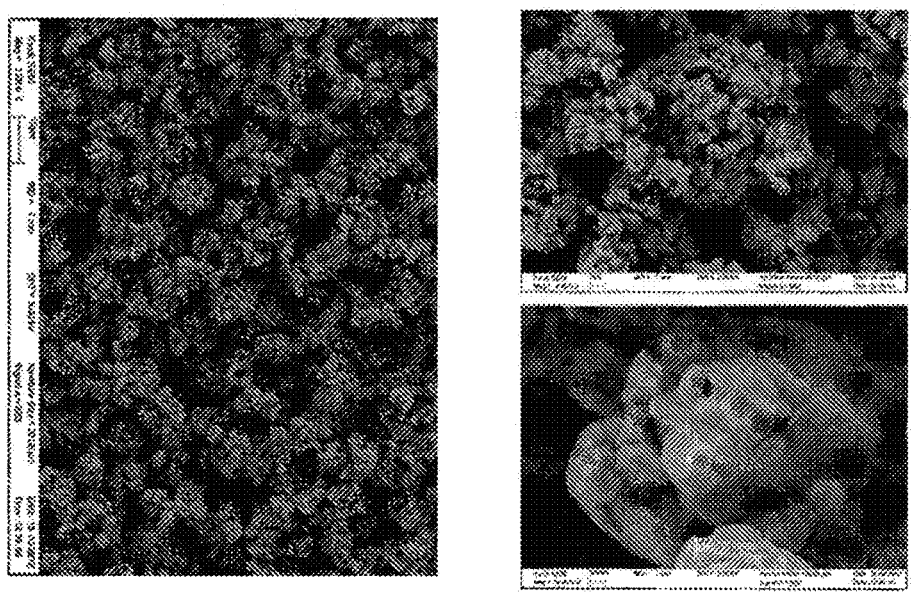
Figure 4: Scanning electron microscopy images of a bio-mineralized composite material

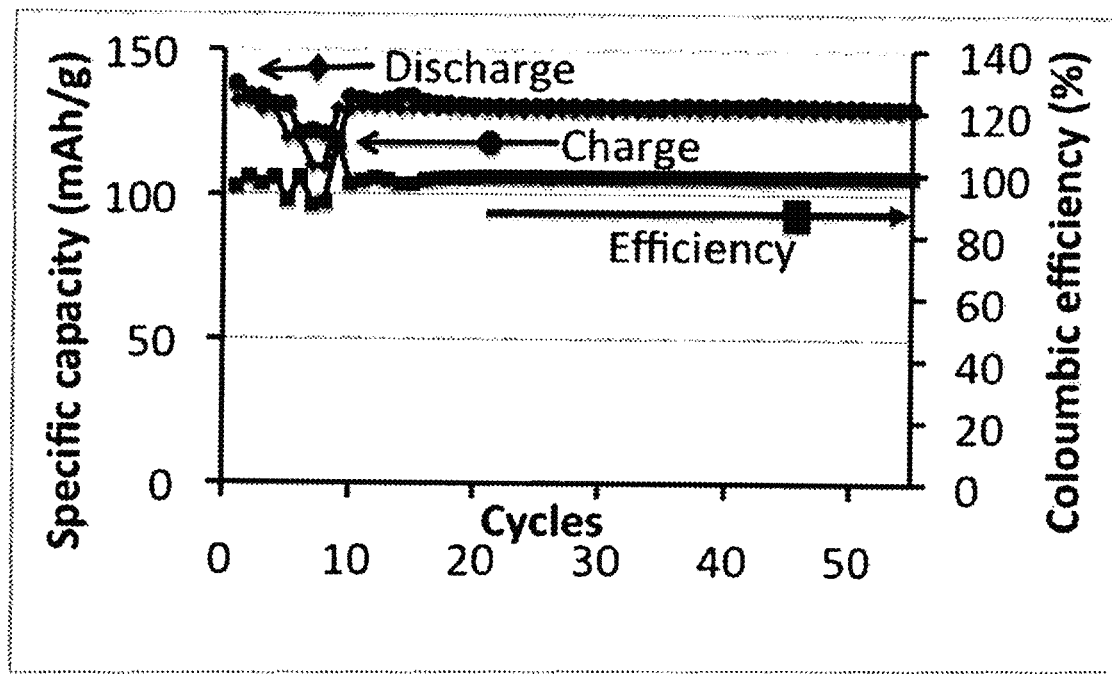
Figure 5: Electrochemical performance of a bio-mineralized composite material
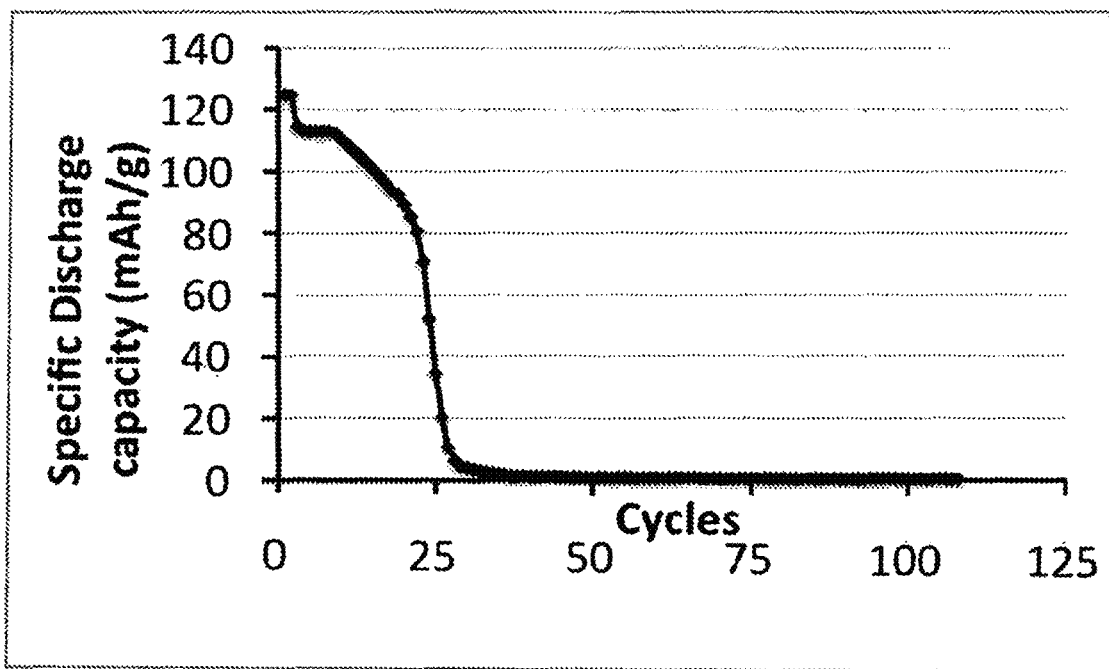
Figure 6(a): Electrochemical cycling result of non bio-mineralized material with lithium counter electrode

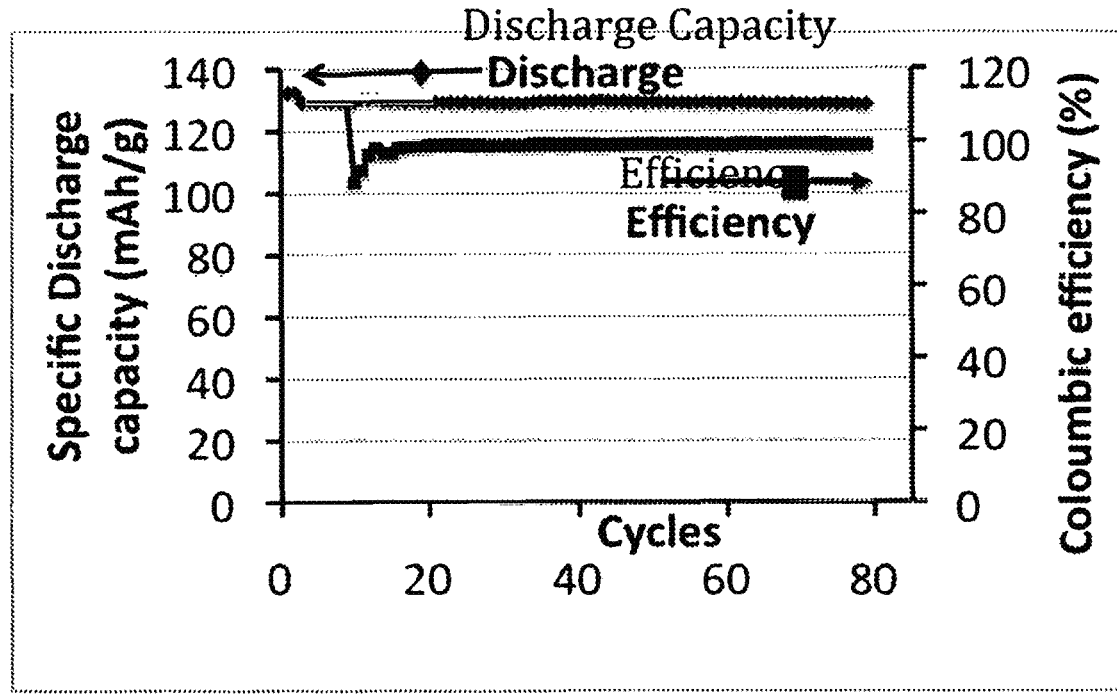
Figure 6(b): Electrochemical cycling of bio-mineralized material
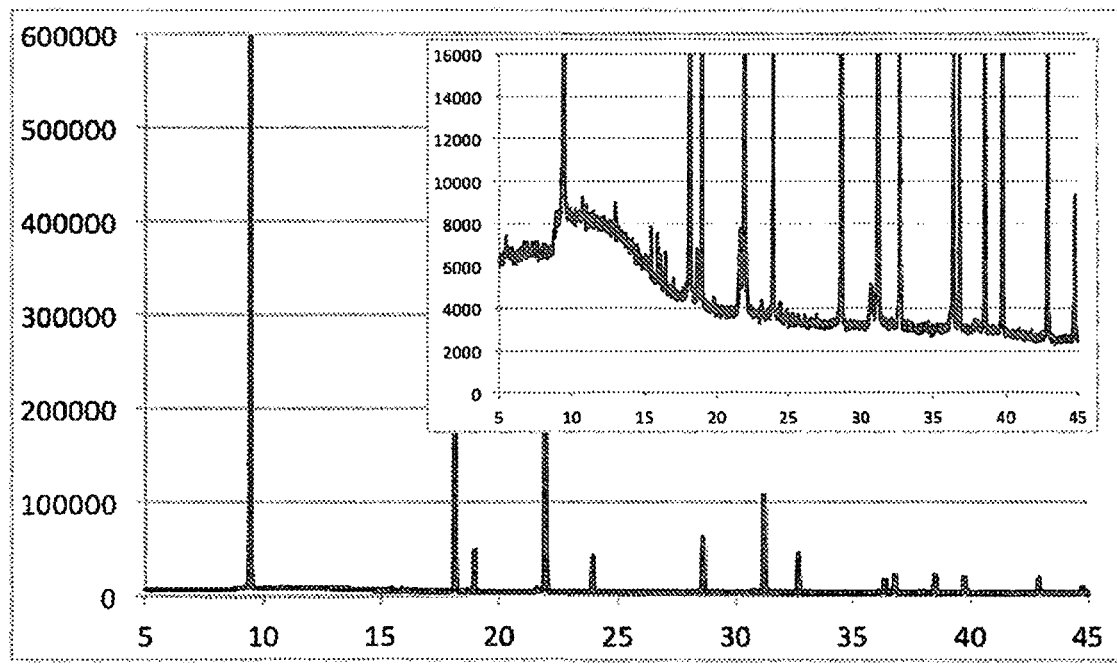
Figure 7: High resolution X-ray diffraction of bio-mineralized material

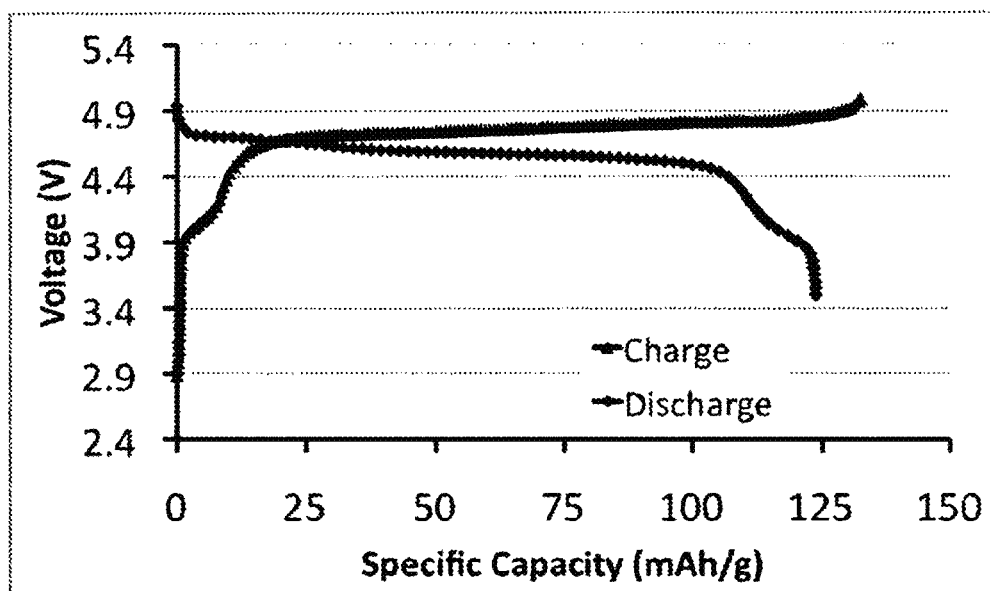
Figure 8: Charge discharge profile of a bio-mineralized material at C/5 rate
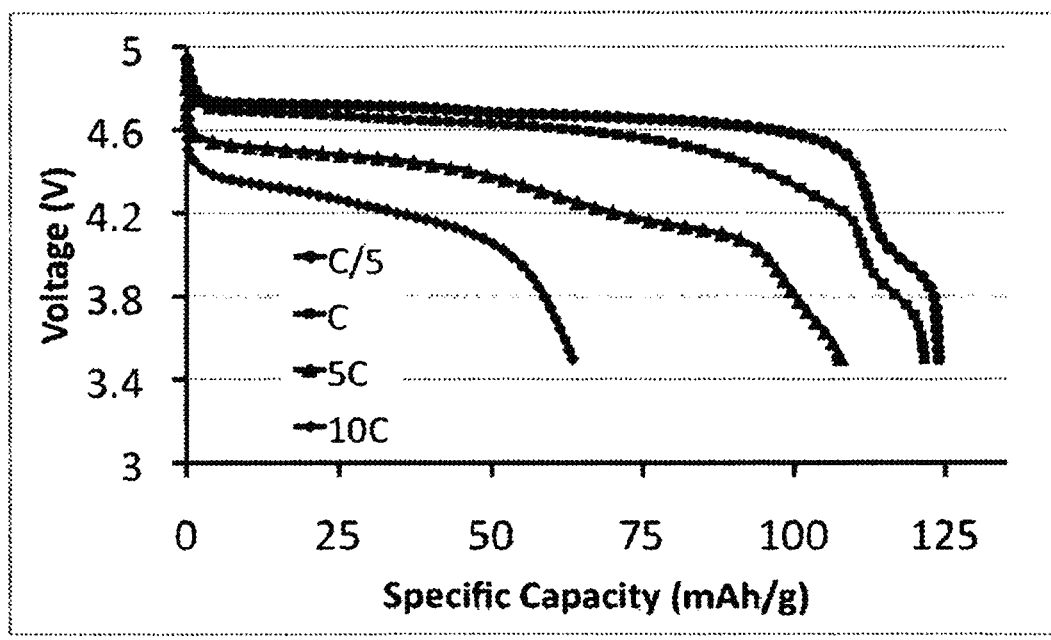
Figure 9: Rate discharge profile of a bio-mineralized material

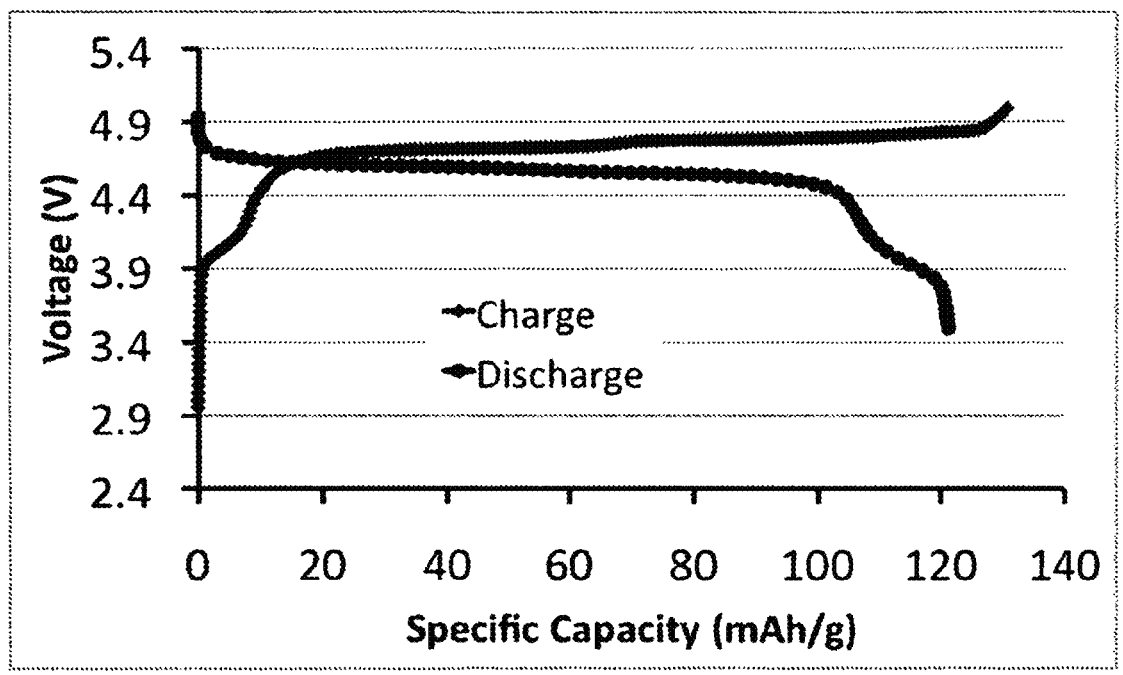
Figure 10: Charge discharge profile of a bio-mineralized material at C/5 rate
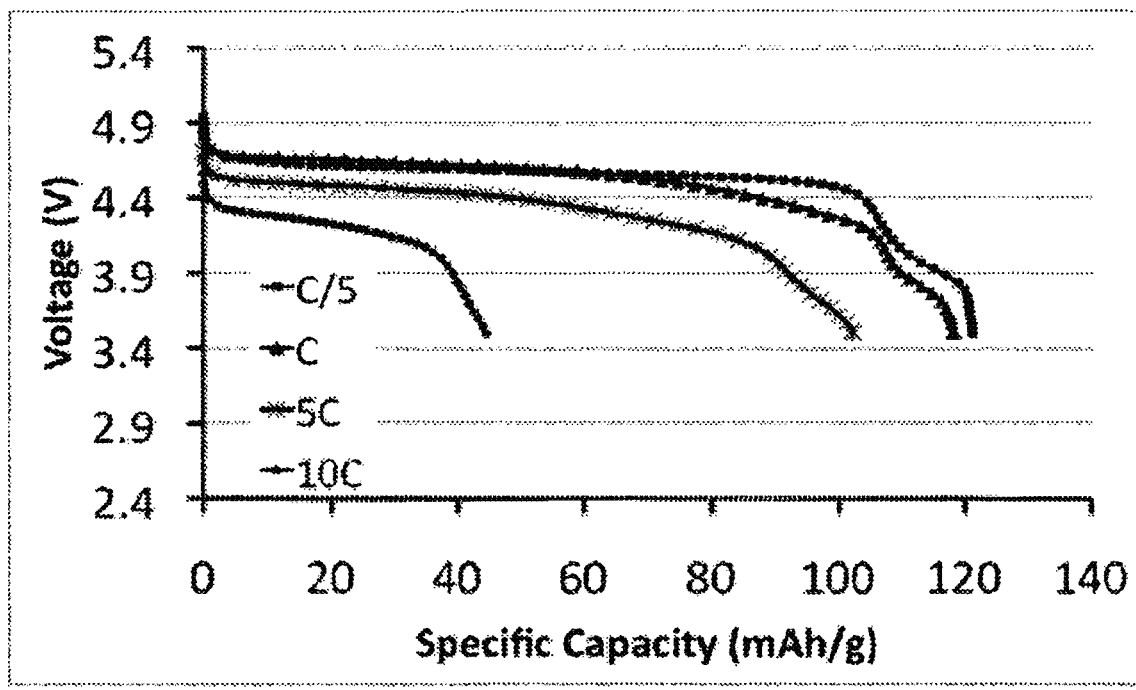
Figure 11: Rate discharge profile of a bio-mineralized material

BIO-MINERALIZED CATHODE AND ANODE MATERIALS FOR ELECTROCHEMICAL CELL

CROSS-REFERENCE TO RELATED APPLICATIONS

This application is a continuation of U.S. patent application Ser. No. 15/699,815, filed Sep. 8, 2017, now pending, which is a continuation of U.S. patent application Ser. No. 14/300,209, filed Jun. 9, 2014, now U.S. Pat. No. 9,799,883, and claims priority to U.S. Provisional Patent No. 61/833,099, filed Jun. 10, 2013, which patent applications are incorporated here by reference in their entirety to provide continuity of disclosure.

FIELD OF THE DISCLOSURE

The present invention generally relates to improved materials for use in electrochemical applications. In particular, the invention relates to bio-mineralized materials for use in electrochemical applications including rechargeable or primary electrochemical cell such as Lithium ion, Lithium sulfur, Sodium ion, Magnesium ion, Lithium air etc. Furthermore, the present invention is usable in other types of energy devices such as fuel cells, capacitors etc.

BACKGROUND OF THE ART

Lithium batteries are widely used in consumer electronics industry due to their high energy density. Majority of the commercial batteries currently in use comprise a negative electrode material graphite along with one of a wide range of positive electrode materials such as lithium cobalt oxide ($LiCoO_2$), lithium manganese oxide ($LiMn_2O_4$), lithium nickel oxide ($LiNiO_2$), lithium nickel cobalt oxide ($LiNiCoO_2$), lithium nickel cobalt manganese oxide ($LiNiMnCoO_2$), lithium metal phosphate ($LiMPO_4$), lithium nickel cobalt aluminum oxide ($LiNiCoAlO_2$) and the like. More recently cell producers have started using high voltage materials like NMC and LMNO on the cathode side and high-energy silicon and tin based alloys or composites on anode side.

However, most of these cathode and anode materials still have limitations. For example, batteries employing lithium cobalt oxide ($LiCoO_2$) use only 50% of the lithium during the charge/discharge process because the voltage is limited to about 4.2 Volt. Charging beyond 4.2 V, the crystal structure of the cell material destabilizes and further leads to self-destruction of the cell. Batteries incorporating lithium cobalt manganese nickel oxide composite material are known to potentially be one of the highest capacity materials, however the material tends to exhibit loss in voltage during repeated battery cycling which is a major drawback. In addition to the above said materials, spinel lithium manganese nickel oxide is another material with high voltage and high energy density. However due to manganese dissolution and other associated issues involved during the course of operation of the cell at high temperature the material performance is seriously harmed.

Besides the self-destruction of the cathodes during cell cycling (charging/discharging) occurs because the electrochemically active material has to sustain the mechanical strain and electrostatic forces while oscillating between different oxidation states, also causing a volume expansion and contraction of the crystallites during charge and discharge processes. Voltage and capacity fade during cycling or at high cell temperatures is one of the key deficiencies in these modern cathode materials. This also causes an electronic connection issue between electrode active particles with the binder as well as with the current collector.

With regard to the anode materials, silicon and tin are widely recognized for their desirable high volumetric and gravimetric capacities. These are much higher than graphite which is about 372 mAhr/g. For years, there has been a wide and well-funded effort to use silicon in rechargeable batteries as an anode material. Researchers have shown that silicon can deliver increased charging/discharging rates, specific capacity and increased power density, but suffer from poor cycle life which is the major limitation.

In the view of foregoing, there is an ongoing need for improved economic material capable of storing high volume of lithium at high voltage and thereby providing a higher energy density and specific capacity than those now in use.

SUMMARY

It is an object of the present invention to provide a bio-mineralized composition for use in an electrochemical redox reaction of an electrochemical cell. It is a further object of the present invention to provide a bio-material capable of storing high volume of lithium at high voltage and thereby providing high energy density and specific capacity. Bio-material also absorbs halide ion and hinders the formation of acid, which usually formed by side reactions in a cell, and protect cell component that eventually lead to a longer life of cell and battery.

In accordance with the above stated objects, the present invention provides a bio-mineralized composition for use in electrochemical applications including but not limited to rechargeable or primary electrochemical cell such as lithium ion, lithium sulfur, sodium ion, magnesium ion, lithium air etc. Furthermore, the invention also relates to use of bio-mineralized materials in various types of energy devices such as fuel cells, capacitors etc.

Therefore the present invention provides generalized chemical formulas for anode and cathode materials. The chemical equation comprises: $y[Li_{1\pm x}M_aPO_c].(1-y)[M_b(PO_c)_{3\pm d}(Ap)_{1\pm e}].C_z$ or $y[Li_{1\pm x}M_aO_c].(1-y)[M_b(PO_c)_{3\pm d}(Ap)_{1\pm e}].C_z$ or $y[Li_{1\pm x}M_aO_c].(1-y)[M_b(PO_c)_{3\pm d}(Ap)_{1\pm e}].C_z$ or $y[Li_{1\pm x}M_aO_c].(1-y)[M_b(PO_c)_{3\pm d}(Ap)_{1\pm e}].C_z$ or $y[M_a].(1-y)[M_b(POc)_{3\pm d}(Ap)_{1\pm e}].C_z$ or $y[Li_{1\pm x}M_aSi_aO_c].(1-y)[M_b(POc)_{3\pm d}(Ap)_{1\pm e}].C_z$, or $y[Li_{1\pm x}M_aO_c].w[Li_{2\pm x}M_aO_e].(1-y-w)[M(POc)_{3\pm d}(Ap)_{1\pm e}].C_z$, or $y[Li_{1\pm x}M_aBO_c].(1-y)[M_b(PO_c)_{3\pm d}(Ap)_{1\pm e}].C_z$, or $y[M_aO_x].(1-y)[M_b(PO_c)_{3\pm d}(Ap)_{1\pm e}].C_z$, where M represents elements and comprises of H, Li, Be, Mg, Ca, Sr, Ba, Ra, Sc, Mo, W, V, Cr, Cu, Zn, Mn, Fe, Ni, Co, Ti, Si, Al, S, Sn, Ga, Ge, Y, Zr, Tc, Ru, Pd, Ag, Dc, Hg, Pb, Au, Pt, Al, Hg, Na, K, Ag, Au, Pt, Li, Rb, Cs, B, C, P, Bi, In, Tl; Ap is from a group of mixtures or comprise of OH, F, Cl, I, N, Br, At, CO3, HCO3, NO3, PO4, SO4, CH3COO, HCOO, C2O4, CN; C is carbon or its allotropes; P is element phosphorous; Si is Silicon; Li is Lithium and B is Boron; x, y, z, w, a, b, c, d and e represent a number and comprises of $x \geq 0$, $1 > y \geq 0$, $1 > w \geq 0$, $100 \geq z \geq 0$, $6 \geq a > 0$, $100 \geq b > 0$, $2 \geq c > 0$, $3 \geq d \geq 0$, $1 \geq e > 0$.

In a further exemplary approach the synthesis of bio-mineralized materials are described. The bio-mineralized composites used in present invention can be synthesized by obtaining electrochemically active materials along with a bio-mineral in a single reaction vessel from their respective molecular precursors in desired ratios. Some of the methods are described through examples though many other methods can also be utilized.

BRIEF DESCRIPTION OF THE DRAWINGS

To further clarify advantages and features of the present disclosure, a more particular description of the disclosure will be rendered by reference to specific embodiments thereof, which is illustrated in the appended drawings. It is appreciated that these drawings depict only typical embodiments of the disclosure and are therefore not to be considered limiting of its scope. The disclosure will be described and explained with additional specificity and detail with the accompanying drawings in which:

FIG. 1: illustrates a ball stick view of a bio-mineralized composite structure with spinel material;

FIG. 2: illustrates a ball stick, view of a bio-mineralized composite structure with olivine material;

FIG. 3: illustrates a FTIR (Fourier Transformed Infrared) of a bio-mineralized composite material;

FIG. 4: illustrates the Scanning electron microscopy images of a bio-mineralized composite material;

FIG. 5: illustrates the electrochemical performance of a bio-mineralized composite material;

FIG. 6(a): illustrates an electrochemical cycling result of non bio-mineralized material with lithium counter electrode;

FIG. 6(b): illustrates an electrochemical cycling result of bio-mineralized material;

FIG. 7: illustrates a high resolution X-ray diffraction of bio-mineralized material;

FIG. 8: illustrates the Charge discharge profile of bio-mineralized material at C/5 rate;

FIG. 9: illustrates the Rate discharge profile of a bio-mineralized material;

FIG. 10: illustrates the Charge discharge profile of a bio-mineralized material;

FIG. 11: illustrates the Rate discharge profile of a bio-mineralized material.

DETAILED DESCRIPTION

For the purpose of promoting an understanding of the principles of the disclosure, reference will now be made to the embodiment illustrated in the drawings and specific language will be used to describe the same. It will nevertheless be understood that no limitation of the scope of the disclosure is thereby intended, such alterations and further modifications in the illustrated system, and such further applications of the principles of the disclosure as illustrated therein being contemplated as would normally occur to one skilled in the art to which the disclosure relates.

It will be understood by those skilled in the art that the foregoing general description and the following detailed description are exemplary and explanatory of the disclosure and are not intended to be restrictive thereof. Throughout the patent specification, a convention employed is that in the appended drawings, like numerals denote like components.

Reference throughout this specification to "an embodiment", "another embodiment" or similar language means that a particular feature, structure, or characteristic described in connection with the embodiment is included in at least one embodiment of the present disclosure. Thus, appearances of the phrase "in an embodiment", "in another embodiment" and similar language throughout this specification may, but do not necessarily, all refer to the same embodiment.

The terms "comprises", "comprising", or any other variations thereof, are intended to cover a non-exclusive inclusion, such that a process or method that comprises a list of steps does not include only those steps but may include other steps not expressly listed or inherent to such process or method. Similarly, one or more devices or sub-systems or elements or structures proceeded by "comprises . . . a" does not, without more constraints, preclude the existence of other devices or other sub-systems or other elements or other structures or additional devices or additional sub-systems or additional elements or additional structures.

Unless otherwise defined, all technical and scientific terms used herein have the same meaning as commonly understood by those of ordinary skill in the art to which this disclosure belongs. The apparatus, system, and method provided herein are illustrative only and not intended to be limiting.

Embodiments of the present disclosure will be described below in detail with reference to the accompanying drawings.

The present invention relates to bio-mineralized composition for use in electrochemical applications including but not limited to portable electronics, cell phones, music players, wearable devices, lap tops, tablets, grid storage, power backup systems, storage of solar energy, storage of wind energy, storage of nuclear energy, storage of bio fuel energy, electric power train, hybrid power train, smart watches, smart phones, smart goggles, smart rings, smart bracelets and other associated devices thereof, In the context of the present invention electrochemical cell refers to one or more from group of lithium ion, sodium ion, manganese ion, lead-acid, aqueous ion, molten salt type, iron nickel, lithium air, lithium sulphur, primary non-rechargeable cell, fuel cell, capacitor, ultra-capacitor, li-ion capacitor, solar cell, solid state battery, flexible battery, Li-polymer battery and other devices used in energy generation and/or energy storage thereof.

According to one aspect, the present invention utilizes strong chemical, electrochemical and bio-compatible characteristics of calcium bio-materials such as Alforsite $Ba_5(PO_4)_3Cl$, Carbonate-rich Fluorapatite $Ca_5(PO_4,CO_3)_3(F,O)$, Chlorapatite $Ca_5(PO_4)_3Cl$, Fluorapatite $Ca_5(PO_4)_3F$, Hydroxyapatite-M $Ca_5(PO_4)_3OH$, Johnbaumite $Ca_5(AsO_4)_3OH$, Johnbaumite-M$Ca_5(AsO_4)_3$ OH, Mimetite $Pb_5(AsO_4)_3Cl$, Mimetite-2M Mimetite-M $Pb_5(AsO_4)_3Cl$, Miyahisaite $(Sr,Ca)_2Ba_3(PO_4)_3F$, Pyromorphite $Pb_5(PO_4)_3Cl$, Stronadelphite $Sr_5(PO_4)_3F$, Svabite $Ca_5(AsO_4)_3F$, Turneaureite $Ca_5(AsO_4)_3Cl$ and Vanadinite $Pb_5(VO_4)_3Cl$ particularly for the usage in an electrochemical cell.

Although battery materials are well known to undergo mechanical stress, chemical deterioration, decrepitation, amorphization, peeling, resistance or impedance gain, structural disorder, voltage fade, capacity fade, degasing, etc. There is a strong need for materials that can help in minimizing these detrimental effects caused by reactions in an electrochemical cell. Furthermore, materials with high thermal and electrochemical stability would help drive electrochemical reactions in the desired direction at elevated temperatures. Hence Hydroxyapatite is a specific example of one of such mineral, which is non-toxic and a low-cost material that can be efficiently utilized as a biomaterial in an electrochemical cell.

Therefore, the present invention utilizes Hydroxyapatite as one of the biomaterials to combat the drawbacks of the existing electrochemical cell thereby providing high energy density and specific capacity. Hydroxyapatite can be found in teeth, bones and muscles of the human body. Hence it is commonly used as a filler to replace amputated bone or as a coating to promote bone ingrowths into prosthetic implants. The bio-compatibility property of Hydroxyapatite with strong acids and bases helps to provide strong mechanical strength which is well studied in biological sciences.

Consequently the present invention provides generalized chemical equations for anode and cathode materials. The chemical equation comprises: $y[Li_{1\pm x}M_aPO_c].(1-y)[M_b(PO_c)_{3\pm d}(Ap)_{1\pm e}].C_z$ or $y[Li_{1\pm x}M_aO_c].(1-y)[M_b(PO_c)_{3\pm d}(Ap)_{1\pm e}].C_z$ or $y[Li_{1\pm x}M_aO_c].(1-y)[M_b(PO_c)_{3\pm d}(Ap)_{1\pm e}].C_z$ or $y[Li_{1\pm x}M_aO_c].(1-y)[M_b(PO_c)_{3\pm d}(Ap)_{1\pm e}].C_z$ or $y[M_a].(1-y)[M_b(POc)_{3\pm d}(Ap)_{1\pm e}].C_z$ or $y[Li_{1\pm x}M_aSi_aO_c].(1-y)[M_b(POc)_{3\pm d}(Ap)_{1\pm e}].C_z$, or $y[Li_{1\pm x}M_aO_c].w[Li_{2\pm x}M_aO_e].(1-y-w)[M(POc)_{3\pm d}(Ap)_{1\pm e}].C_z$, or $y[Li_{1\pm x}M_aBO_c].(1-y)[M_b(PO_c)_{3\pm d}(Ap)_{1\pm e}].C_z$, or $y[M_aO_x].(1-y)[M_b(PO_c)_{3\pm d}(Ap)_{1\pm e}].C_z$ Where M represents elements and comprises of H, Li, Be, Mg, Ca, Sr, Ba, Ra, Sc, Mo, W, V, Cr, Cu, Zn, Mn, Fe, Ni, Co, Ti, Si, Al, S, Sn, Ga, Ge, Y, Zr, Tc, Ru, Pd, Ag, Dc, Hg, Pb, Au, Pt, Al, Hg, Na, K, Ag, Au, Pt, Li, Rb, Cs, B, C, P, Bi, In, Tl, where Ap is from a group of mixtures or comprise of OH, F, Cl, I, N, Br, At, CO3, HCO3, NO3, PO4, SO4, CH3COO, HCOO, C2O4, CN.

C is carbon or its allotropes; P is element phosphorous; Si is Silicon; Li is Lithium; B is Boron; O is Oxygen and x, y, w, z, a, b, c, d and e represent a number which comprises of $x \geq 0$, $1 \geq y \geq 0$, $1 > w \geq 0$, $100 \geq z \geq 0$, $6 \geq a > 0$, $100 \geq b > 0$, $2 \geq c > 0$, $3 \geq d \geq 0$, $1 \geq e > 0$.

In yet another aspect of the present invention FIG. 1 and FIG. 2 illustrates ball stick views of the bio-mineralized composite structure with Spinel and Olivine type respectively. The bio-mineralized composition utilized in the present invention is in the form of a coating on a particle and/or dissolved in a crystal and/or physical mixture and/or coating on a film and/or continuous film on a substrate and/or on a film of electrochemically active material where in the bio-mineralization is the process by which living organisms produce minerals, often to harden or stiffen existing tissues. For instance, consider bone in a human body which is the store room of minerals such as metals or complexes. The bone has two components inorganic and organic. The inorganic component comprises of carbonated hydroxyapatite, an anisotropic dielectric material that allows three-dimensional flow of electrons or current which gives rise to piezoelectric current that balances acid-base reactions in human body. Similarly, a battery is compared to a human body where several reactions are taken place. Battery is said to exhibit oxidation-reduction process and also produces acids by side reactions and thereby act differently at different temperatures. Hence by integrating bio-mineralization technique, wherein the electrochemically active material of the battery is coupled with bone apatite to produce a new class of materials called bio-mineralized materials that can be used in batteries to obtain high energy density and specific capacity.

Hence the bio-material obtained through bio-mineralization technique used in present invention has a primary particle size of 0.2 nm-1,000 micron; secondary particle size distribution ranging from 0.001 micron to 10,000 micron; coating from 0.0001% to 99% by weight; porosity of 0.0001% to 99% by volume. The morphology of the bio-material includes and not limited to spherical, platelet, rod, flake, needle, multifaceted, nano particle, or finger. Furthermore, the bio-material is present as at least 0.001% in structure and/or 0.001% in coating. Hence, these properties of the bio-material aid its use as anode and/or cathode in an electrochemical cell.

Typically bio-mineralized materials are crystallized in systems such as cubic, tetragonal, orthorhombic, hexagonal, trigonal, triclinic and monoclinic. Hence the bio-materials are oriented along one or more crystallographic planes such as 001, 010, 100, 200, 020, 002, 123, 300, 030, 003, 201, 212, 111, 101, 011 and 110. Therefore, the orientation of the bio-mineralized materials in crystallographic planes provides better consistency from cell to cell for electrochemical performance. Moreover, the carbon utilized in the equation includes but not limited to organic, natural, graphite, diamond, carbon black, acetylene black, Sp2, Sp3, Sp, carbon fibers, carbon nanotubes (single or multiwall), conducting polymer, or graphene.

In yet another aspect of the present invention the bio-mineralized composition are synthesized by various methods such as but not limited to solid state, sol-gel, wet method, solvent method, precipitation, pyrolysis, electrospinning, electrochemical, electroplating, vapor deposition, stirring, bead milling, hydrothermal synthesis, reverse-micellar, nano precursors, solvothermal, solgel, plasma, solid state, carbothermal, microwave, ball milling, high energy ball milling, high shear mixing and mechanochemical.

The bio-mineralized composite material was subjected to FTIR (Fourier Transformed Infrared) studies. FIG. 3 of the present invention illustrates the FTIR (Fourier Transformed Infrared) of a bio-mineralized material in use. All characteristic frequencies relating apatite can be seen at respective values, slight shift in peaks with respect to pristine bio-mineral like hydroxyapatite, indicates a local bonding interaction between apatite and transition metal framework.

Further the bio-mineralized material $[Li_{1.02}Mn_{1.5}Ni_{0.48}O_4]_{0.97}[Ca_5(PO_4)_3(OH)]_{0.03}$ was subjected to SEM (Scanning Electron Microscope) studies in order to examine the surface morphology. FIG. 4 illustrates the SEM images of the bio-mineralized material $[Li_{1.02}Mn_{1.5}Ni_{0.48}O_4]_{0.97}[Ca_5(PO_4)_3(OH)]_{0.03}$. Surface morphology of particles is very homogeneous and the primary particles are of polyhedral and smooth shapes. Having such surfaces on particles or coatings or films assist in formation of better solid to electrolyte interfaces and thus improves electrochemical properties of the cell.

In yet another aspect of the present invention electrochemical performance of the bio-mineralized material was assessed to determine the charging capacity, discharging capacity and columbic efficiency. FIG. 5 illustrates the electrochemical performance of a bio-mineralized material wherein the circle indicates the charge capacity in mAh/g; diamond indicates the discharge capacity in mAh/g and rectangle represents coulombic efficiency. Initial 10 cycles were discharge at variable rates, each of which of 2 cycles at rates C/10, C/5, 1 C, SC and 10 C respectively. After the $10^{th}$ cycle discharge rates is kept constant at 1 C rate where the coulombic efficiency is shown to be greater than 99%.

Furthermore, the bio-mineralized and non-bio-mineralized materials were compared by electrochemical cycling in order to determine the structural response of the materials. FIGS. 6(a) and 6(b) illustrates the electrochemical cycling of both non-bio-mineralized and bio-mineralized formulations of an electrochemical material at temperature 40° C., wherein it is evident that there is an improvement in the bio-mineralized version of the material in terms of long term cycling as well as coulombic efficiency. Equivalent electrochemically active material without any bio-mineral component fades very fast and within 20 cycles the capacity is substantially diminished.

Additionally, the bio-mineralized material was also subjected to high resolution X-ray diffraction in order to identify the crystalline nature of the material. FIG. 7 illustrates a high-resolution X-ray diffraction spectrum of the bio-mineralized material wherein when the diffraction pattern is seen at better resolution (inset image), all reflections from the composite structure can be seen between 5 and 45 2Θ. All brags reflections correspond to the crystallographic planes of a composite crystal structure.

In a further exemplary approach the synthesis of bio-mineralized materials are described. The bio-mineralized composites used in the present invention can be synthesized by obtaining electrochemically active materials from their respective molecular precursors in desired ratios along with a bio-mineral in a single synthesis vessel. Some of the methods are described below through examples though many other methods can also be utilized.

Example 1

Preparation of $[Li_{1.02}Mn_{1.5}Ni_{0.48}O_4]_{0.97}[Ca_5(PO_4)_3(OH)]_{0.03}$ Using In-Situ Approach.

450 g of water was taken in a 1-liter beaker and following ingredients were added: 44.3 g Lithium carbonate, 142 g Manganese (III) oxide, 43.7 g of Nickel (II) oxide, green; and 12.7 g of Calcium hydroxide. Mix the ingredients briefly with a spatula, and then using a high shear mixer, with a rotor-stator and square hole stator, mix for an additional 2 minutes at 8000 RPM to reduce the grittiness of the precursors. The pH was 11.08.

Then the high energy milling technique with 2 mm YTZ media was employed. During the course of this process the solution was run continuously with peristaltic pump at 220 RPM (flow rate of 1 LPM) agitator at 1200 RPM generating a power of 1.8 KW. Further use a 5 liter jacketed recirculation tank with an electric stirrer. Start processing the solutions by pouring the contents of the 1-liter beaker into the tank while the mill is running.

Meanwhile in a separate 250 mL beaker, add 11.9 g of ortho-Phosphoric acid (85%) to an additional 100 g of RO (Reverse Osmosis) water and mix well. Add this acid solution slowly to the processing material in the tank allowing it to mix well. Record the time processing started, and calculate the time needed to reach an energy per kg dry material of 10,000 kj/kg using the dry weight of the materials. In this case, the time processed was 24 minutes. Finally collect the sample at the end of the time calculated. A typical final percent solids of this mixture obtained was 22%, pH of 10.60, and viscosity of 178 cP.

Again run the mixed solution in high energy milling, time with 0.3 mm YTZ media. Using a peristaltic pump at 220 RPM (flow rate of 1 LPM) agitator at 1780 RPM generating a 1.5 KW power, again on continuous mode with the help of 5 liter jacketed recirculation tank and an electric stirrer. Use the weight of the slurry and final solids percent to calculate a weight of dry solids, and use that to calculate the time for the energy per kilogram of 5000 kj/kg. The conditioned precursor mix is processed in recirculation mode as above with no further additions for the prescribed energy. In this case, the sample was processed for 9 minutes. The sample was collected at the end. The final solids were 17%, pH was 10.89, and viscosity was 64 cP.

The obtained mixture was then spray dried while keeping the outlet temperature maintained at about 100° C. Overall 89% recovery was obtained. Further the obtained dry powder was subjected to muffle furnace in air to treat 20 g of powder at 900° C. for 6 hours. The yield of finished bio-mineralized material $[Li_{1.02}Mn_{1.5}Ni_{0.48}O_4]_{0.97}[Ca_5(PO_4)_3(OH)]_{0.03}$ obtained was 18 g or 90%.

Specific surface area as measured by BET was 2.0 m2/g. Electrochemical results were as given in the Table 1 and FIG. 8 and FIG. 9. First cycle charge capacity of 131 mAh/g and discharge capacity of 124 at C/5 achieved keeping the voltage window between 3.5 and 5 Volt. Since most of the capacity was delivered above 4.6 V at various rates with high retention makes this material of high interest for high energy and high power application.

TABLE 1

Electrochemical results of bio-mineralized material synthesized using in-situ approach

| Specific Capacity (mAh/g) | C/5 | C | 5 C | 10 C |
|---|---|---|---|---|
| Charge | 131 | 127 | 124 | 100 |
| Discharge | 124 | 121 | 107 | 63 |

Example 2

Preparation of $[Li_{1.02}Mn_{1.5}Ni_{0.48}O_4]_{0.97}[Ca_5(PO_4)_3(OH)]_{0.03}$ Using Ex-Situ Approach.

450 g of water was taken in a 1-liter beaker and following ingredients were added: 44.3 g Lithium carbonate, 142 g Manganese (III) oxide, and 43.7 g of Nickel (II) oxide, green. Mix the ingredients briefly with a spatula, then using a high shear mixer with a rotor-stator and a square hole stator, mix for an additional 2 minutes at 8000 RPM to reduce the grittiness of the precursors. The pH was 10.91.

Then, the obtained mixture was milled with 2 mm YTZ media and a peristaltic pump at 220 RPM (flow rate of 1 LPM) and agitator at 1200 RPM generating a power of 1.6 KW. Further use a 5 liter jacketed recirculation tank with an electric stirrer to process the mixture by pouring the contents to a 1-liter beaker into the tank while the mill is still running.

Meanwhile in a separate 250 mL beaker, add 11.9 g of ortho-Phosphoric acid (85%) to an additional 50 g of DI (De-ionized) water and mix well. Also in a separate beaker add 50 g of RO water and 12.7 g of Calcium hydroxide. Add the acid solution slowly to the Calcium hydroxide solution in the beaker with continuous stirring to avoid lumps. It is better to add the dry $Ca(OH)_2$ to the diluted acid. Further add the obtained mixture to the processing slurry in the 5-liter tank. Record the time processing started, and calculate the time needed to reach an energy per kg dry material of 10,000 kj/kg using the dry weight of the materials. In this case, the time processed was 27 minutes. Collect the sample at the end of the time calculated. A typical final percent solids obtained was 20%, with pH of 10.85, and viscosity of 89 cP. The dry weight collected was 173 g, a 67% yield.

In next step mill the mixture again, now with 0.3 mm YTZ media and a peristaltic pump at 220 RPM (flow rate of 1 LPM) and agitator at 1780 RPM generating a power of 1.5 KW. Further use a 5 liter jacketed recirculation tank with an electric stirrer for recirculation. Use the weight of the slurry and final solids percent to calculate a weight of dry solids, and use that to calculate the time for the energy per kilogram of 5000 kj/kg. The conditioned precursor mix is processed in recirculation mode as above with no further additions for the prescribed energy. In this case, the sample was processed for 9 minutes. The sample was collected at the end. The final solids were 16%, pH was 10.87, and viscosity was 92 cP. The dry weight collected was 128 g for a 74% Recovery.

After completion, the slurry was spray dried and overall 92% recovery was obtained. Further the obtained dry powder was subjected to muffle furnace in air to treat 20 g of powder at 900° C. for 6 hours. The yield of finished bio-mineralized material $[Li_{1.02}Mn_{1.5}Ni_{0.48}O_4]_{0.97}[Ca_5(PO_4)_3(OH)]_{0.03}$ obtained was 18 g or 90%.

Electrochemical results were as given in the Table 2 and FIG. 10 and FIG. 11. First cycle charge capacity of 130 mAh/g and discharge capacity of 121 at C/5 was achieved keeping voltage window between 3.5 and 5 V. Similar to previous synthesis method, most of the capacity was delivered above 4.6 V at various rates and higher retention, which makes this material of high interest for high energy and high power application. This also indicates that the formation of a composite predominantly governs the performance and is independent of synthesis route or method of processing.

TABLE 2

Electrochemical results of bio-mineralized material synthesized using ex-situ approach

| Specific Capacity (mAh/g) | C/5 | C | 5 C | 10 C |
|---|---|---|---|---|
| Charge | 130 | 149 | 134 | 108 |
| Discharge | 121 | 118 | 102 | 44 |

From the foregoing discussion, it is apparent that the bio-mineralized materials perform much better than the non-bio-mineralized versions of the electrochemically active materials. Biomineralization can be performed in various ways including but not limited to crystal level dissolution, molecular level interaction, continuous or non-continuous film, coating on surface, physical mixture of particles, foam, thin film, mono layer, multiplayer, core shell and sandwich structure. In addition, due to bio-mineralization, materials with high energy and power are thereby obtained.

I claim:

1. A bio-mineralized composition, comprising:
   an electrochemically active material being synthesized with a bio-material, the biomaterial represented by a general formula $[M_b(PO_4)_{3\pm d}(A_p)_{1\pm e}] \cdot C_z$,
   wherein M represents at least one element selected from a group consisting of H, Li, Be, Mg, Ca, Sr, Ba, Ra, Sc, Mo, W, V, Cr, Cu, Zn, Mn, Fe, Ni, Co, Ti, Si, Al, S, Sn, Ga, Ge, Y, Zr, Tc, Ru, Pd, Ag, Dc, Hg, Pb, Au, Pt, Al, Hg, Na, K, Ag, Au, Li, Rb, Cs, B, C, P, Bi, In and Tl; Ap represents group of mixtures consisting of OH, F, Cl, I, N, Br, At, $CO_3$, $HCO_3$, $NO_3$, $PO_4$, $SO_4$, $CH_3COO$, HCOO, $C_2O_4$ and CN; C represents carbon or its allotropes and/or electrically conductive organic; P represents element phosphorous; Si represents silicon; Li represents lithium; B represents boron; O represents oxygen; z, b, d and e represent a number which comprises of $100 \geq z \geq 0$, $100 \geq b < 0$, $3 \geq d \geq 0$, $1 \geq e > 0$.

2. The bio-mineralized composition according to claim 1, wherein the bio-material $[M_b(PO_4)_{3\pm d}(Ap)_{1\pm e}]$ is oriented along one or more crystallographic planes within the structure of the electrochemically active material.

3. The bio-mineralized composition according to claim 1, wherein the bio-material $[M_b(PO_4)_{3\pm d}(Ap)_{1\pm e}]$ is further present as a coating on a particle of the bio-mineralized composition.

4. The bio-mineralized composition according to claim 1, wherein the bio-material $[M_b(PO_4)_{3\pm d}(Ap)_{1\pm e}]$ is a physical mixture.

5. The bio-mineralized composition according to claim 1, wherein the bio-material $[M_b(PO_4)_{3\pm d}(Ap)_{1\pm e}]$ is further present as a coating on a film of the electrochemically active material.

6. The bio-mineralized composition according to claim 1, wherein the bio-material $[M_b(PO_4)_{3\pm d}(Ap)_{1\pm e}]$ is further present as a coating on a particle of the bio-mineralized composition.

7. The bio-mineralized composition according to claim 1, wherein the bio-material $[M_b(PO_4)_{3\pm d}(Ap)_{1\pm e}]$ is further present as a continuous film on a substrate of the electrochemically active material.

8. The bio-mineralized composition according to claim 1, wherein the bio-material $[M_b(PO_4)_{3\pm d}(Ap)_{1\pm e}]$ is further present as a non-continuous film on a substrate of the electrochemically active material.

9. The bio-mineralized composition according to claim 1, wherein the bio-material $[M_b(PO_4)_{3\pm d}(Ap)_{1\pm e}]$ is further present as a continuous film on a film of the electrochemically active material.

10. The bio-mineralized composition according to claim 1, wherein the bio-material $[M_b(PO_4)_{3\pm d}(Ap)_{1\pm e}]$ is further present as a non-continuous film on a film of the electrochemically active material.

11. The bio-mineralized composition according to claim 1, wherein the bio-mineralized composition is used in an electrochemical cell, the electrochemical cell includes but not limited to one or more from the group of lithium ion, sodium ion, manganese ion, aqueous ion, molten salt type, iron nickel, lithium air, lithium sulfur, primary non-rechargeable cell, fuel cell, nickel cadmium, nickel-metal hydride, nickel-zinc, zinc bromide, vanadium redox, sodium-sulfur, silver-oxide, quantum battery, capacitor, ultra-capacitor, li-ion capacitor, solar cell, solid state battery, flexible battery, zinc-air, zinc-carbon, aluminum-air, Bunsen, chromic acid, Daniell, dry, Edison-lalande, grove, leclanche, nickel oxyhydroxide, silicon air, Weston, zamboni, Li-polymer battery and other devices used in energy generation and/or energy storage thereof.

12. The bio-mineralized composition according to claim 1, wherein a primary particle size of the bio-material composition ranges from 0.2 nm-1,000 micron.

13. The bio-mineralized composition according to claim 12, wherein a secondary particle size of the bio-material composition has a distribution ranging from 0.001 micron to 10,000 microns.

14. The bio-mineralized composition according to claim 13, wherein a coating of the bio-material composition ranges from 2% to 99% by weight.

15. The bio-mineralized composition according to claim 14, wherein a porous body of the bio-material composition has a porosity ranging from 0.0001% to 99.99% by volume.

16. The bio-mineralized composition according to claim 1, wherein a morphology of the bio-material composition is one of spherical, platelet, rod, flake, needle, multifaceted, xerogel, aerogel, foam, film and finger.

17. The bio-mineralized composition according to claim 1, wherein the carbon comprises graphite, diamond, carbon black, acetylene black, Sp2, Sp3, Sp, carbon fibers, electrically conductive organic, electrically conductive polymer, fullerene, single or multiwall carbon nanotubes, graphene and combinations thereof.

18. The bio-mineralized composition according to claim 1, wherein the bio-material $[M_b(PO_4)_{3\pm d}(Ap)_{1\pm e}]$ is further present as a coating on the bio-mineralized composition capable of being used as a cathode or an anode in an electrochemical cell.

19. The bio-mineralized composition according to claim 1, wherein a coating agent enhances formation of solid-to-electrolyte interfaces.

* * * * *